United States Patent [19]
Manchester

[11] Patent Number: 5,793,745
[45] Date of Patent: Aug. 11, 1998

[54] BUNDLED PROTECTION SWITCHING IN A WIDE AREA NETWORK BACKGROUND OF THE INVENTION

[75] Inventor: James S. Manchester, Freehold, N.J.

[73] Assignee: Bell Communications Research, Inc., Morristown, N.J.

[21] Appl. No.: 645,638

[22] Filed: May 15, 1996

Related U.S. Application Data

[60] Provisional application No. 60/017,908 May 6, 1996.

[51] Int. Cl.$^6$ .................................................. H04J 3/14
[52] U.S. Cl. ................................................... 370/224
[58] Field of Search ................................. 370/221–224, 370/242, 249, 395, 397, 399; 340/825.01, 825.05, 827, 825.16; 371/20.1, 20.5, 20.6; 395/182.02

[56] References Cited

U.S. PATENT DOCUMENTS

| | | | |
|---|---|---|---|
| 5,150,356 | 9/1992 | Tsutsui | 370/223 |
| 5,341,364 | 8/1994 | Marra et al. | 370/223 |
| 5,406,401 | 4/1995 | Kemer | 370/224 |
| 5,442,620 | 8/1995 | Kremer | 370/224 |
| 5,583,849 | 12/1996 | Ziemann et al. | 370/224 |

OTHER PUBLICATIONS

T-H Wu et al., "A Class of Self–Healing Ring Architectures for SONET Network Applications", IEEE Trans. Comm., vol. 40, No. 11, pp. 1746–1756 Nov. '1992.

S. C. Farkouh, "Managing ATM—Based Broadband Networks", IEEE Comm. Mag., pp. 82–86, May 1993.

J. Anderson et al., "Fast Restoration of ATM Networks", IEEE Jon Sel. Areas Comm. vol. 12, No. 1, pp. 128–138, Jan. 1994.

T–H Wu, "Emerging Technologies for Fiber Network Survivability", IEEE Comm. Mag., pp. 58–74, Feb. 1995.

K. R. Krishnan et al., "Improved Survivability with Multi–Layer Dynamic Routing", IEEE Comm. Mag., pp. 62–68, Jul. 1995.

L. Nederlof et al., "End–to–End Survivable Broadband Networks", IEEE Comm. Mag., pp. 63–70, Sep. 1995.

R. Kawamura et al., "Self Healing Virtual Path Architecture in ATM Networks", IEEE Comm. Mag., pp. 72–70, Sep. 1995.

E. Oki et al., "Multiple–Availability–Level ATM Network Architecture", IEEE Comm. Mag., pp. 80–88, Sep. 1995.

K. P. May et al., "A Fast Restoration System for ATM–Ring–Based LANs", IEEE Comm. Mag., pp. 90–98, Sep. 1995.

Jianxu Shi et al., "Hierarchical Self–Healing Rings", IEEE/ACM Trans. on Networking, vol. 3, No. 6, pp. 690–697, Dec. 1995.

M. Herzberg et al., "The Hop–Limit Approach for Spare–Capacity Assignment in Survivable Networks", IEEE/ACM Trans. on Networking, vol. 3, No. 6, pp. 775–784, Dec. 1995.

*Primary Examiner*—Chau Nguyen
*Attorney, Agent, or Firm*—Joseph Giordano; David A. Hey; Loria B. Yeadon

[57] ABSTRACT

Protection Bundles (PB) facilitate efficient protection switching in a network and can be applied at any network layer. A PB is preferably assigned to all working signals sharing the exact same protection facilities. The working facilities that a PB traverses define a Bundled Protection Fragment (BPF)(560, 564, 568). The end-points of the BPF exchange coordination protocol messages along the protection facilities when necessary. The protection facilities between the end-points of a BPF define each BPFs Common Protection Route (CPR)(562, 566, 570).

6 Claims, 11 Drawing Sheets

BUNDLED PROTECTION SWITCHING IN A WIDE AREA NETWORK BACKGROUND OF THE INVENTION

RELATED APPLICATIONS

This is a continuation of U.S. provisional Pat. application Ser. No. 60/017.908 entitled "Bundled Protection Switching" filed on May 6, 1996, abandoned. The contents of that application are incorporated herein by reference.

BACKGROUND OF THE INVENTION

1. Field of the Invention

The present invention relates to a wide area network, such as a Synchronous Optical Network (SONET) or Synchronous Digital Hierarchy (SDH), and more particularly, to an efficient and fast method for protection switching in a wide area network.

2. Description of Related Art

Wide area networks (WAN) are communications systems which interconnect often far-flung local area networks (LAN) or other type of networks, such as voice communications networks. (Attached as Appendix A is a Glossary of Acronyms.) A WAN may allow communications to be transmitted from one network to another network located in a different campus, a different city, or a different country. One type of WAN is a Synchronous Optical Network (SONET), as it is called in North America, or its closely related European counterpart, a Synchronous Digital Hierarchy (SDH). The terms SONET and SDH are used herein interchangeably. A SONET is an optical-based carrier (transport) network that uses synchronous (or plesiochronous) operation between network components.

FIG. 1 illustrates a typical SONET/SDH WAN. A SONET 100 may provide an optical communications network connecting several cities, such as cities A, B, C, and D. A number of nodes 102 are connected by links 104 which may be, for example, optical fibers. These nodes may be network elements (NE). Network elements may be, for example, service adapters (end user interfaces such as terminals, access nodes, or terminal multiplexers), add-drop multiplexers (devices which add or drop signals from one channel to another), digital cross connects (hubs which can add/drop and may operate at different carrier rates), or other network devices.

Many networks, including LANs and WANs, provide for "survivability" or "protection" of the network in the event of a node malfunction or break in a link. For example, SONET provides linear and ring-type protection called protection switching. Linear protection switching includes Automatic Protection Switching (APS). SONET ring protection switching includes Unidirectional Path Switched Rings (UPSR) and Bidirectional Line Switched Rings (BLSR). Protection switching may be initiated if a link between nodes is broken or if the quality of signals between nodes deteriorates.

Linear protection switching is described with reference to FIGS. 2A, 2B, and 2C. Linear protection switching may be used in a 1+1 arrangement (as seen in FIG. 2A), or an m:n arrangement such as a 1:1 arrangement (as seen in FIG. 2B), or a 1:n arrangement (as seen in FIG. 2C).

As seen in FIG. 2A, a 1+1 arrangement 200 has a headend bridge 202 and a tailend switch 204. In an optical network the bridges/switches 202, 204 are connected by two optical fibers 206, 208. It is understood that in non-optical networks, the bridges/switches may be connected by other transmission connections, such as a wire or wireless communications link. The first fiber 206 is the "working facility". The second fiber 208 is a back-up facility called a "protection facility". In this arrangement, the signals transmitted by the headend bridge 202 are bridged over both fibers 206, 208. The tailend switch 204 performs switching by selecting the signals from one of the fibers according to a particular criteria. This is a dedicated protection architecture because the protection facilities are always providing protection.

Linear m:n arrangements are where m protection facilities support n working facilities. As seen in FIG. 2B, a 1:1 arrangement 225 has a headend switch 226 and a tailend switch 228. The switches 226, 228 are connected by two optical fibers 230, 232. One fiber is the "working facility"; the other fiber is the "protection facility". In this arrangement, signals are transmitted by the headend switch 226 over the working facility. The tailend switch 228 monitors the signals on the working facility for a failure, such as a signal loss or degradation. If the tailend switch 228 detects a failure, it transmits to the headend switch a coordination signal instructing the headend to switch the working signals to the protection facilities. Thus, if the signal on the current working facility ceases or has a degraded quality, the tailend switch 228 detects this condition and signals the headend switch 226 to activate a switching device 234 to divert the signals to the other fiber, making this new fiber the working facility. The tailend switch 228 also activates a switching device 236 to the other fiber. An advantage of the 1:1 arrangement is that the two fibers 230, 232 are not bridged together, which allows the protection facility to be used for extra unprotected traffic.

As seen in FIG. 2C, a 1:n arrangement 250 includes a headend switch 252 and a tailend switch 254 which are connected by a number of fibers 256–262. Typically, most of the fibers 256–260 are working facilities. One (or a few) fiber 262 is provided as a "protection facility". Protected signals are transmitted on only the working facilities 256–260. Extra unprotected signals may be sent over the protection facilities as in the 1:1 arrangement. If a failure is detected on one of the working facilities, the tailend switch 254 detects this condition and signals the headend switch 252 to activate a switching device 264 to divert the signals from the faulty working facility to the protection facility 262. The tailend switch also activates a switching device 266 to select the protection facilities.

A UPSR is described with reference to FIGS. 3A and 3B. In a UPSR 300, a number of nodes 302A, 302B, 302C are connected by a working facility 304 and a protection facility 306. During normal operation, the protection facility 304 carries a duplicate copy of the signal transmitted on the working facility 306, but in the opposite direction. If a failure occurs, such as a signal loss or degradation, the link on which the failure occurs is eliminated from the ring. As seen in FIG. 3B, a break occurs on a link between two nodes 302A, 302B. When a node detects a failure, it sends an alarm on the working facility to the other nodes. Node C will receive the alarm, alerting it to the failure, and will then select the signals from the protection facilities 306.

FIGS. 4A–4D illustrate protection switching in the network illustrated in FIG. 1. For simplicity and clarity of illustration, consider only unidirectional events occurring from left to right. Also assume that each network element handles at least 4096 virtual paths (VPs) and virtual channels (VCs). (A VP is a point-to-point signal connection in a multiplexed system. A VP is made up of a number of virtual channels (VC), which are links between the end points of a VP.) Also assume that the theoretical minimum number of cells are transmitted and that each virtual path (VP) coordinates its own protection switching.

It is important to note that not all links are provided with protection facilities. Referring to FIG. 4A, assume that protection facilities are only provided for certain working signals as follows:

| Protected Working Signals Between Nodes | Associated Protection Facilities Route |
|---|---|
| Node C to node D | Through nodes G and F |
| Node C to node F (through node D) | Through node G |
| Node C to node H (through nodes D and F) | Through node G and F |
| Node D to node F | Through nodes C and G |
| Node D to node H (through node F) | Through nodes C, G, and F |
| Node F to node H | Nodes F and H |

FIG. 4A illustrates the working facilities 402 and protection facilities 404. For clarity of illustration, subsequent figures do not illustrate both facilities, but the reader understands that certain working signals listed above have protection facilities.

As seen in FIG. 4A, in the network 100', node C sends signals to node D over link CD 406. Node C sends signals to node F over links CD 406 and DF 408. As seen in FIG. 4B, a link failure occurs between nodes C and D. This failure is detected by node D. Node D terminates protected VPs between nodes C and D. The signals sent out by the nodes include small, fixed length data units called cells. Node D sends out coordination cells for each VP (or VC) that passes through that node. (Recall that each VP coordinates its own protection switching.) This requires 4096 coordination cells 408 to be transmitted through the path including nodes F and G to inform node C of the failure and to instruct it to switch working VPs to the protection facilities. Node C then sends coordination acknowledgement cells for each VP (VC) that has been switched. This requires 4096 coordination acknowledgment cells 410 to be transmitted along the path including nodes G and F to node D. At this point, node D begins receiving VPs from node C on the protection facilities 404. Working VPs are now restored between nodes C and D on protection facilities 404 through the path including nodes F and G.

As seen in FIG. 4C, in addition to terminating protected VPs, node D is a through node for protected VPs between nodes C and F and between nodes C and H. Node D, having detected a failure on the node C-D link 406, sends 4096 trigger cells 412 to node F and 4096 trigger cells to node H at the time it is sending the 4096 coordination cells to node C. Upon receipt of trigger cells 412, nodes F and H act in the same manner as node D with respect to node C in order to receive VPs from node C on the protection facilities. That is, nodes F and H each send 4096 coordination cells 414 to node C and each receives 4096 acknowledgment cells 416 from node C over the protection facilities. This reestablishes the VPs between node C and node F and node C and node H through the path including node G.

FIG. 4D illustrates the new VPs 418, 420, 422 established between node C and nodes D, F and H, respectively, using the protection facilities.

The resources needed to establish new VPs in the event of a failure are "expensive" in network processing resources, network bandwidth, and time used. Therefore, it is an object of the present invention to provide an improved method for protecting a network in the event of a failure.

SUMMARY OF THE INVENTION

This and other objects of the present invention are provided by Protection Bundles (PB) which facilitate efficient protection switching and can be applied at any network layer and to any network topology.

A PB is preferably defined by all working signals sharing the exact same protection facilities. The working facilities that a PB traverses define a Bundled Protection Fragment (BPF). The end-points of the BPF exchange coordination protocol messages along the protection facilities when necessary. The protection facilities between the end-points of a BPF define the end-points for a Common Protection Route (CPR). When a failure is detected, each affected PB is switched from its BPF to its CPR so that all signals assigned to the PB are switched together. This protection switching method is analogous to performing one switching, triggering, and coordination process (if necessary) for an entire PB.

A preferred method performed by a node that detects a failure comprises the steps of:

1. the node determines whether or not it is associated with a protection bundle; if not, there are no signals to restore and the process ends;
2. if the node is associated with a protection bundle, the node determines whether or not it terminates a BPF;
3. if the node terminates a BPF, the PB is switched from the working facility BPFs to protection facility CPRs; if necessary a coordination mechanism is initiated to effect the switching;
4. after the PB is switched, the node determines if it is a through node for other BPFs; if not, the signals are restored and the process ends;
5. if the node is a through node for a BPF, the node sends out a trigger mechanism to the end points of the through BPF;
6. the signals are restored and the process ends;
7. if the node does not terminate any BPFs, the node sends out a trigger mechanism to the end points of the through BPFs;
8. the signals are restored and the process ends.

A preferred method performed by a node that does not detect a failure comprises the steps of:

1. the node receives a trigger indicating that another node has detected a failure;
2. when the trigger is received, the node determines whether or not it is associated with a protection bundle; if not, there are no signals to restore and the process ends;
3. if the node is associated with a protection bundle, the node determines whether or not it terminates a BPF;
4. if the node terminates a BPF, the PB is switched from the working facility BPFs to protection facility CPRs and a coordination mechanism is initiated, if necessary;
5. if the node is not the termination of the BPF specified by the trigger, the node forwards the trigger mechanism to the end points of the through BPFs;
6. the signals are restored and the process ends.

BRIEF DESCRIPTION OF THE DRAWINGS

The present invention is described with reference to the following figures.

DETAILED DESCRIPTION OF A PREFERRED EMBODIMENT

The invention is described in four parts. First, Protection Bundles (PB) are described. Second, the protection bundling process is described. Third, the efficiency of protection bundling is demonstrated. Fourth, a conclusion is provided.

1. Description of Protection Bundles

The present invention may be used in any network configuration using protection switching. One such network is a SONET. The invention is applicable at any network layer. For example, the invention may be used with the SONET layer. However, the invention is not described with reference to the SONET layer because SONET is a mature technology. Implementing changes to the established SONET layer protocol is possible, but such changes may affect the existing standards. The present invention will be described, therefore, with respect to less mature technologies such as Asynchronous Transfer Mode (ATM) and Wavelength Division Multiplexing (WDM) protocols. The term "signal" is used herein generically to describe any data transmission, such as ATM VPs and ATM VCs, or individual wavelengths in a WDM system.

Figure 1:
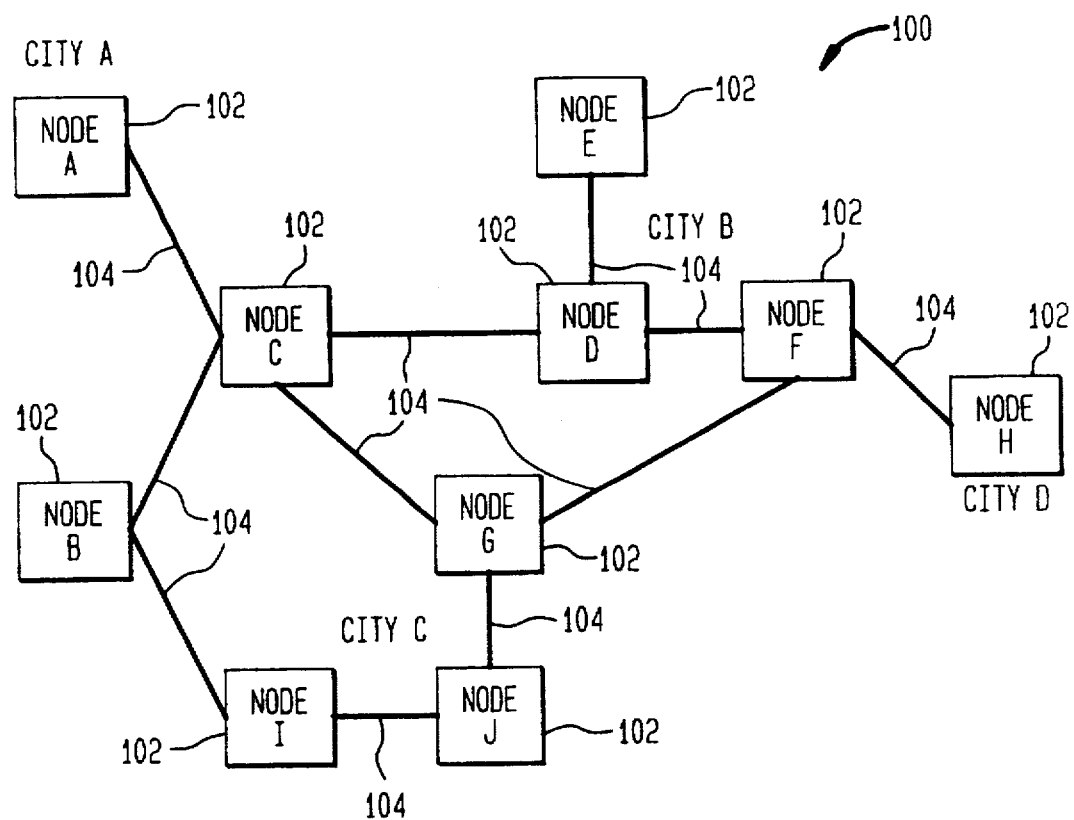
FIG. 1 illustrates a SONET/SDH WAN.
Figure 2A:
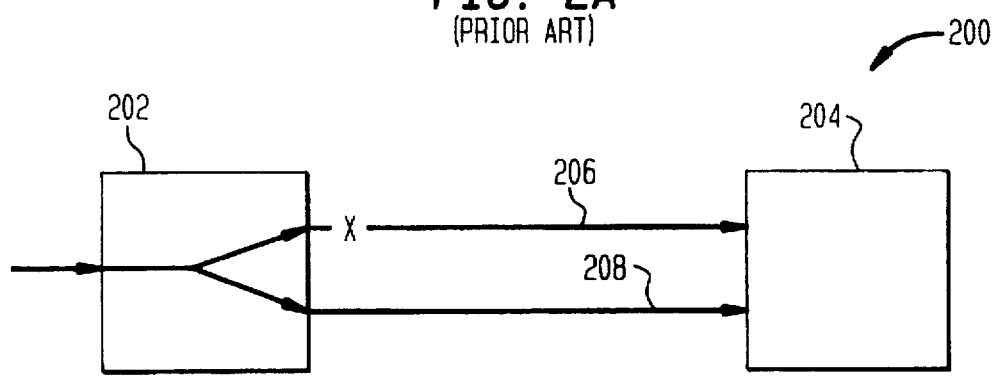
FIGS. 2A, 2B, and 2C illustrate 1+1, 1:1, and 1:n SONET protection switching arrangements.
Figure 2B:
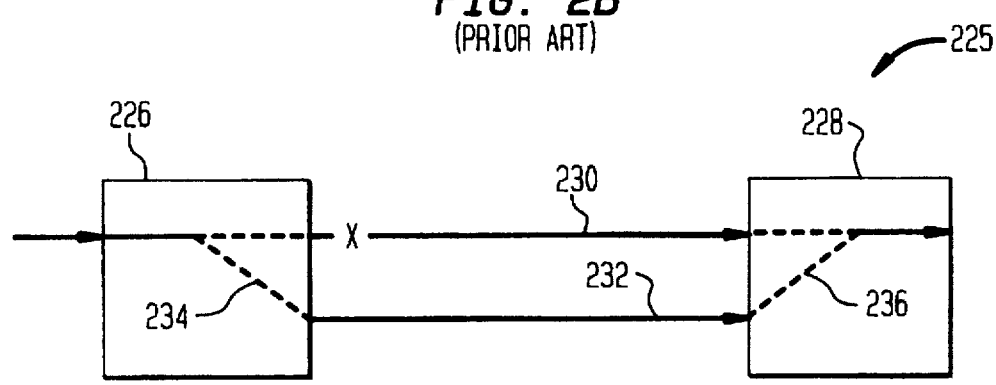
Figure 2C:
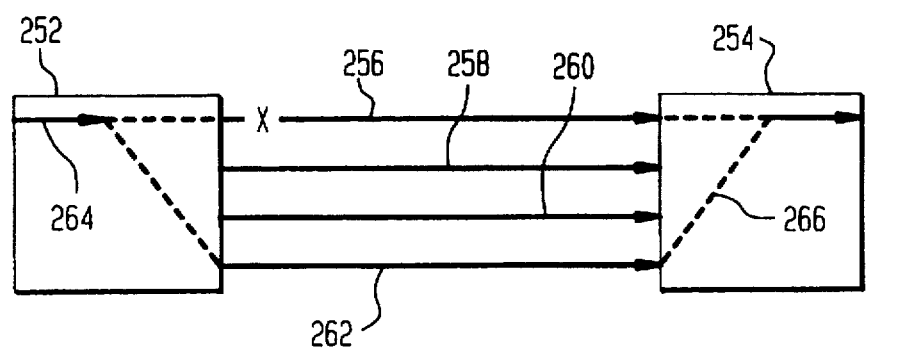
Figure 3A:
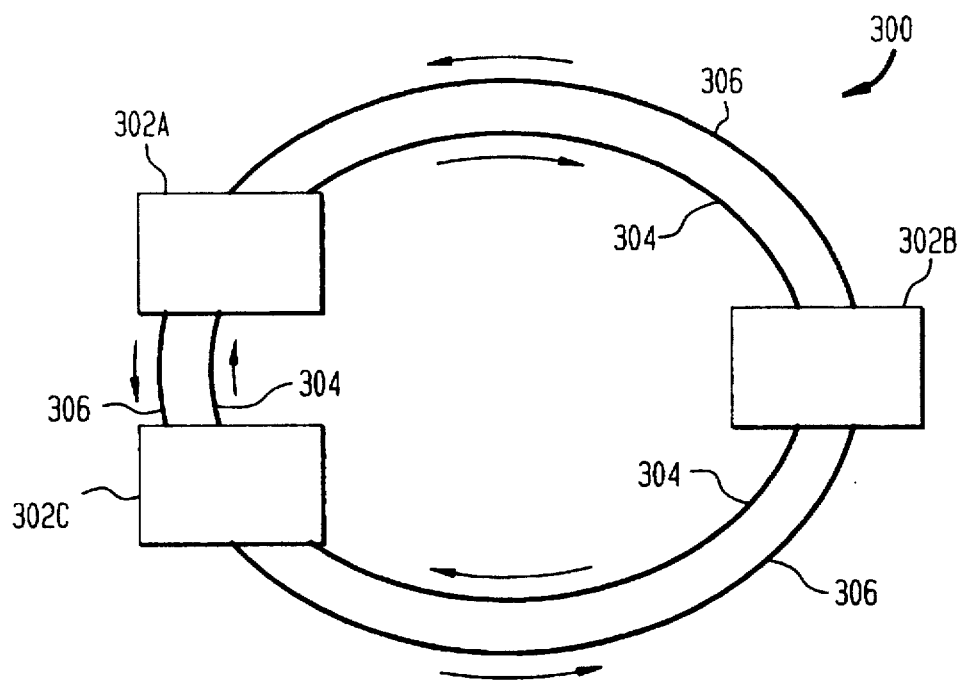
FIGS. 3A–3B illustrate protection switching in a unidirectional path switched ring.
Figure 3B:
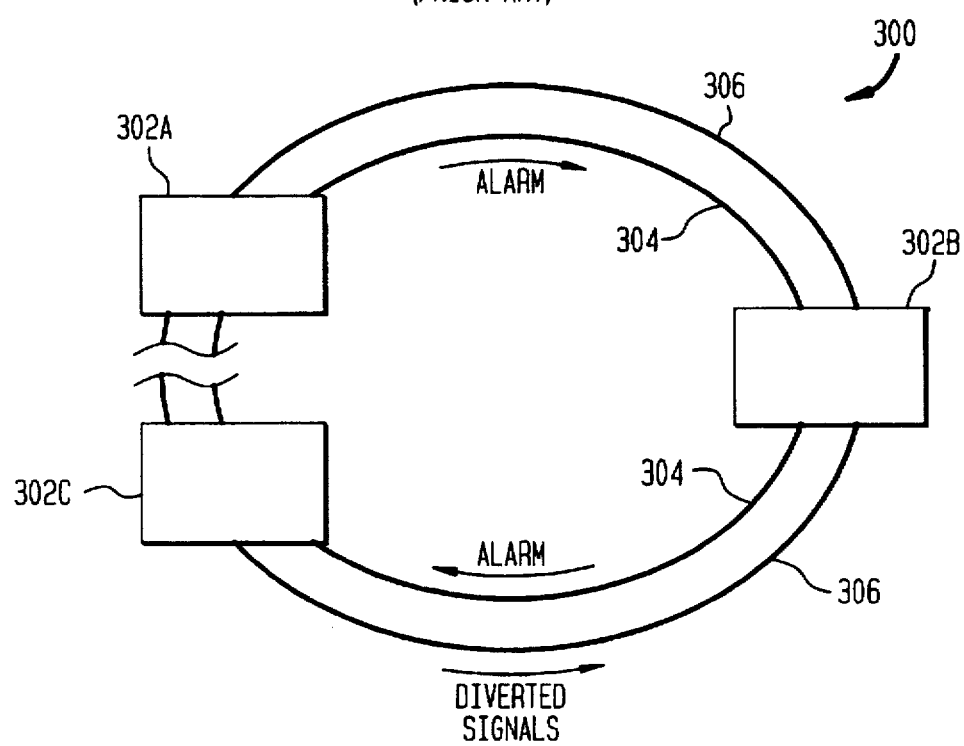
Figure 4A:
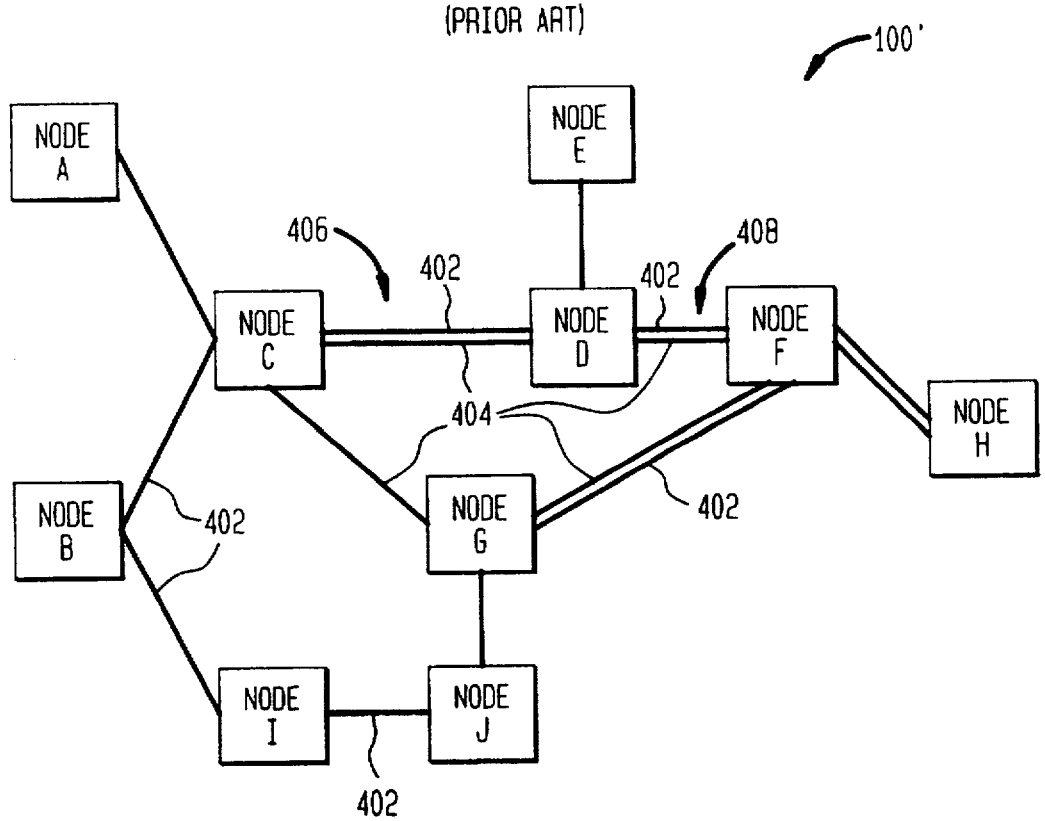
FIGS. 4A, 4B, 4C, 4D illustrate protection switching in the SONET/SDH WAN of FIG. 1.
Figure 4B:
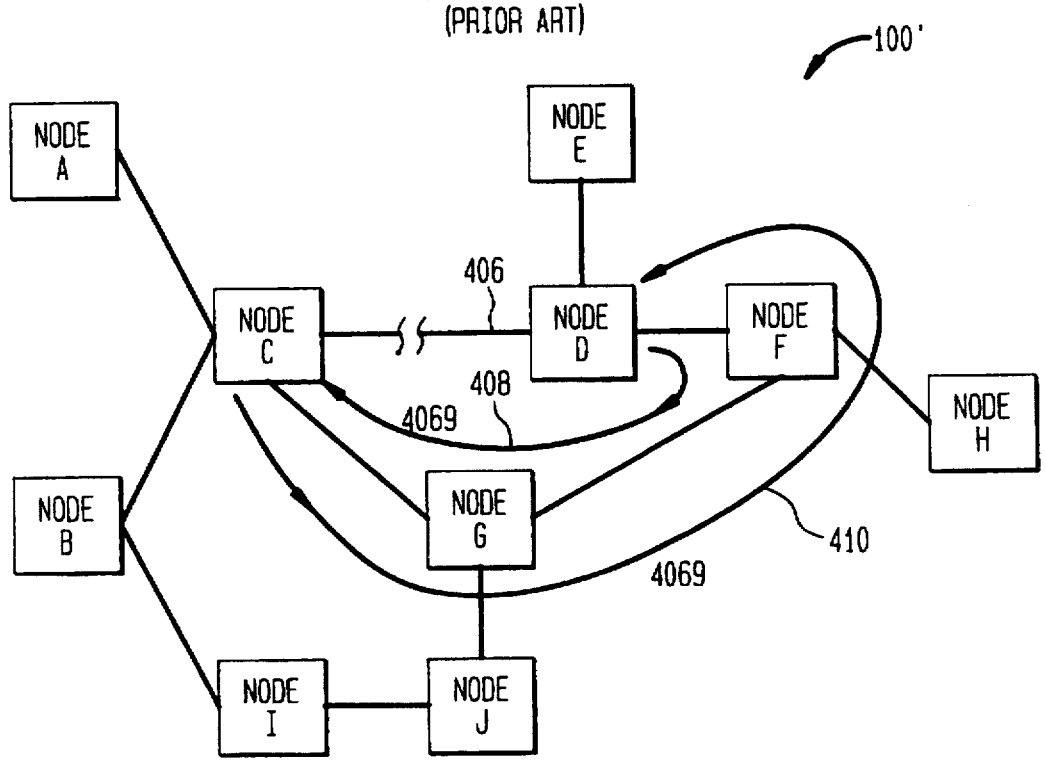
Figure 4C:
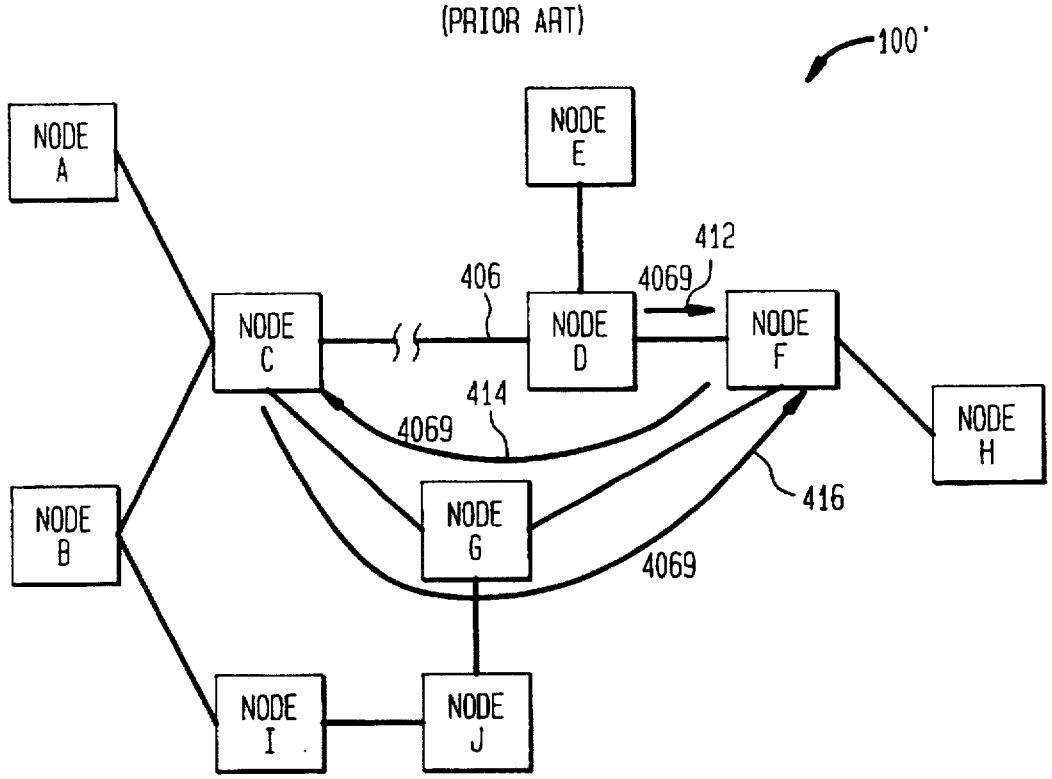
Figure 4D:
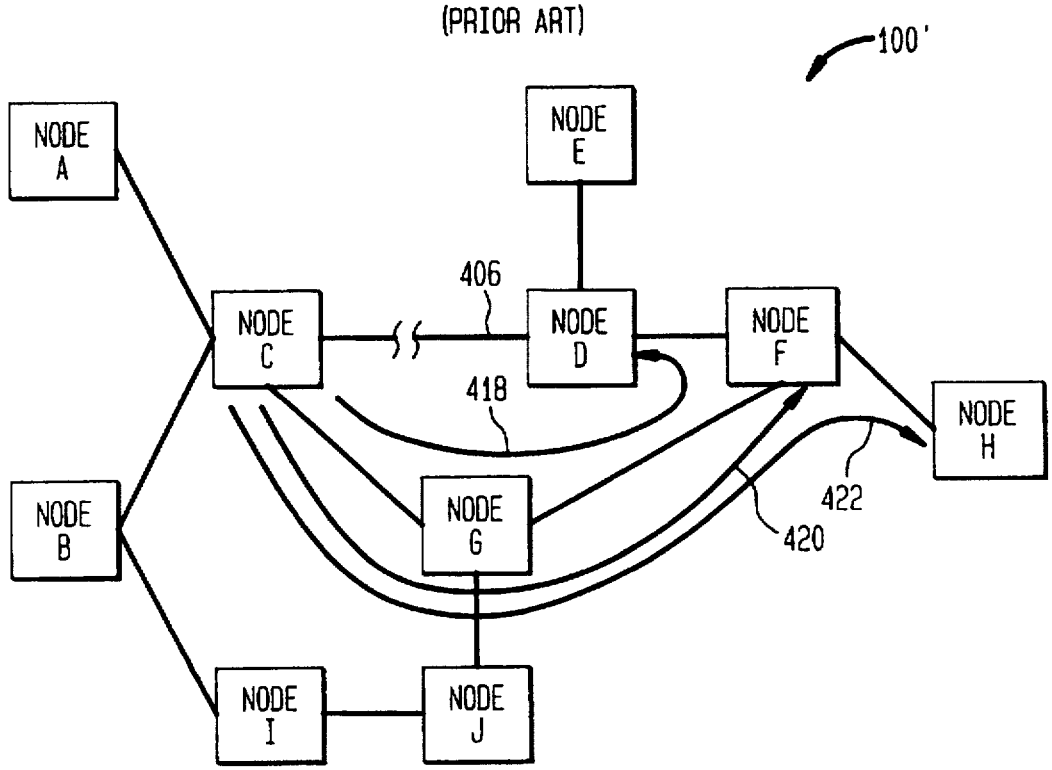
Figure 5A:
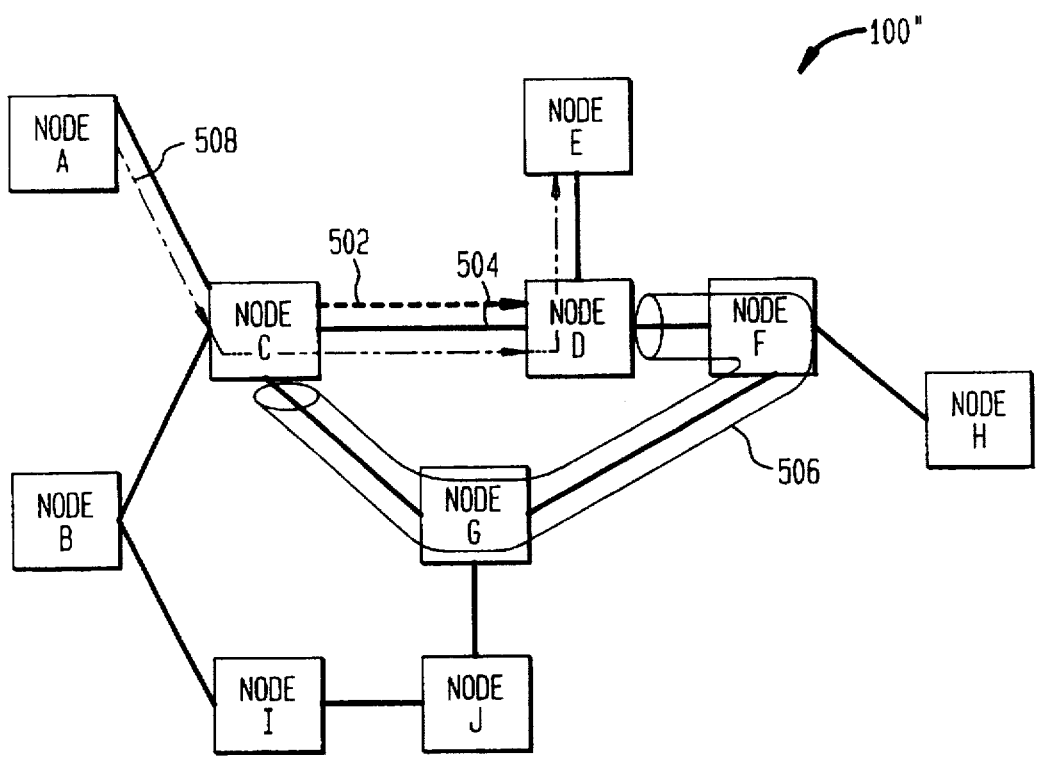
FIGS. 5A, 5B, 5C, 5D illustrate a SONET/SDH network having protection bundling according to a preferred embodiment of the present invention.
Figure 5B:
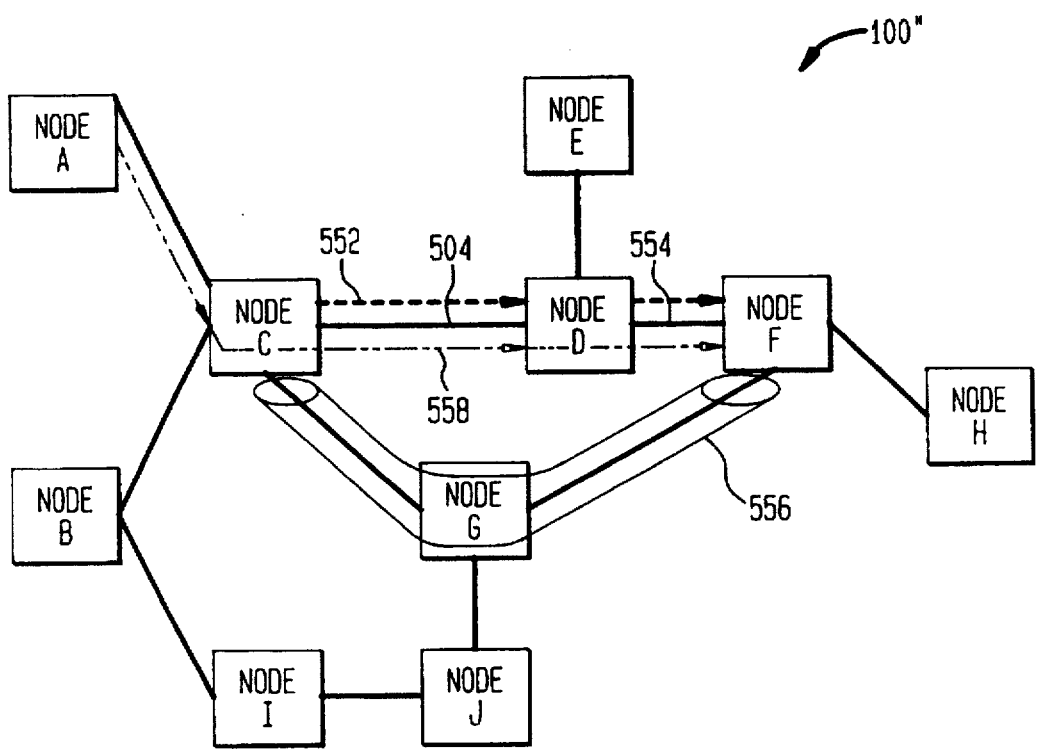

FIGS. 5A and 5B illustrate the network 100" of FIG. 1, except it uses the present invention. Recall that protection facilities are provided as described above in relation to FIG. 4A. The invention includes a Protection Bundle (PB). A protection bundle is preferably assigned to all working signals sharing the exact same protection facilities (e.g., protection fibers and protection NEs).

As seen in FIG. 5A, for example, working signals 502 sent from node C to node D on protected link CD 504 all have the same protection facilities 506 and are therefore are assigned to PB CD. Working signals 508 sent between node A and node E also have the same protection facilities 506 as the signals sent between node C to node D (because the portions of working signals traversing the links between nodes A-C and D-E are not protected) are therefore are also assigned to PB CD.

As seen in FIG. 5B, working signals 552 from node C to node F on protected links CD 504 and DF 554 all have the same protection facilities 556 and are therefore assigned to PB CF. Working signals 558 sent from node A to node F also have the same protection facilities 556 as the signals between nodes C-F and therefore are also assigned to PB CF. Thus, working signals between these nodes are bundled together for protection switching.

Figure 5C:
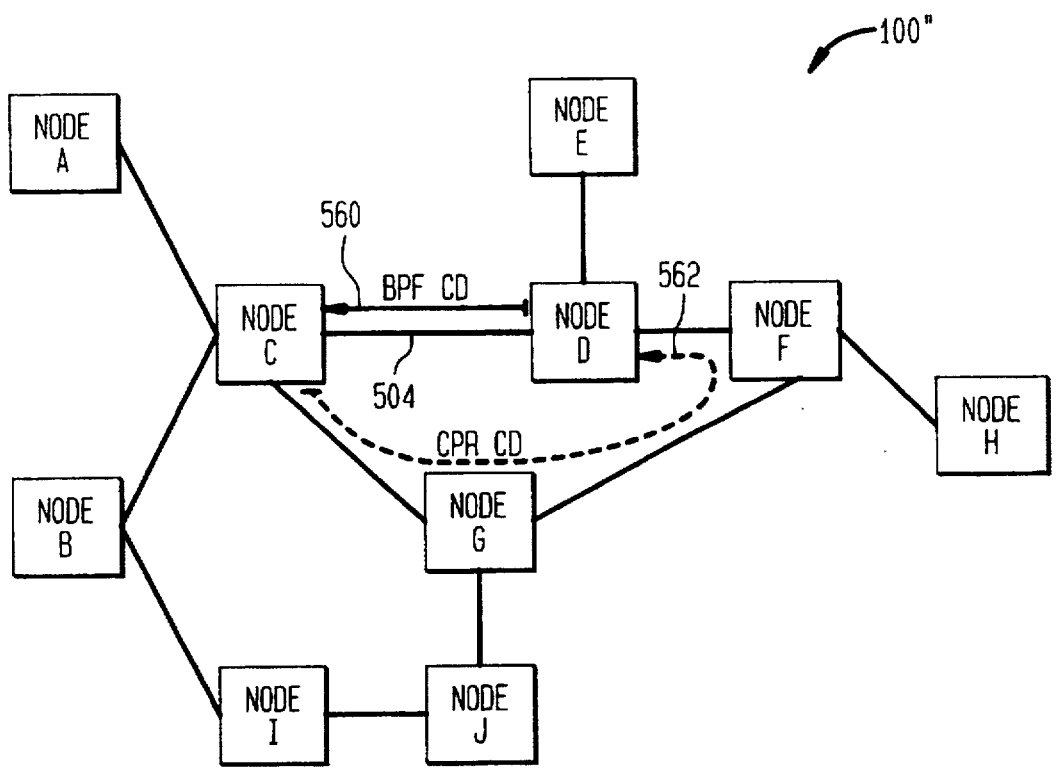

The working facilities (e.g., fibers and NEs) that a PB traverses define a Bundled Protection Fragment (BPF). As seen in FIG. 5C, the working facilities between nodes C and D define BPF CD 560. The end-points of the BPF are also the end-points which exchange coordination protocol messages (an example of SONET layer coordination protocol messages are APS protocol messages in linear SONET APS) along the protection facilities when necessary (e.g., in the case of bidirectional or m:n protection switching where the tailend switch instructs the headend to activate a switching device).

The end-points of a BPF are also the end-points for a Common Protection Route (CPR). A CPR includes shared protection facilities for a unique PB. As seen in FIG. 5C, the protection facilities between nodes C and D define CPR CD 562. In the absence of a failure causing a PB protection switch, the CPR may be fully utilized (e.g., a 1+1 PB protection switching scheme), or may provide the facilities for extra unprotected signals that are preempted by the PB signals during a PB protection switch (e.g., a 1:n PB protection switching scheme).

Figure 5D:
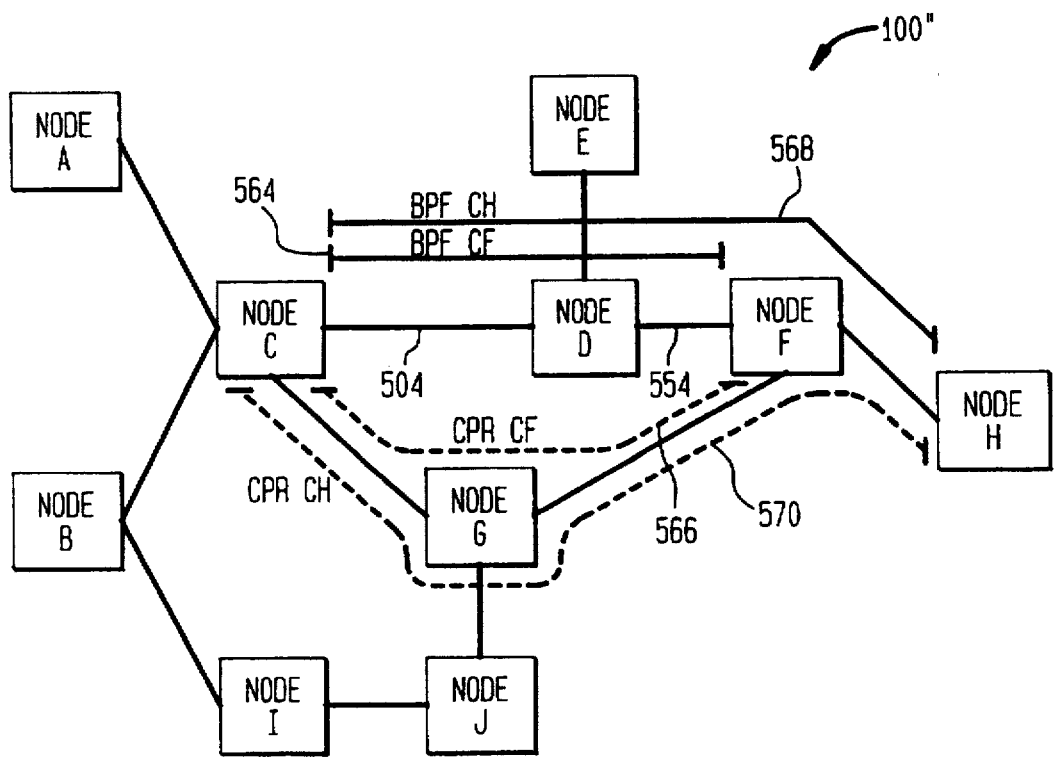

FIG. 5D illustrates two other BPFs and CPRs in this network 100". Working facilities and NEs between nodes C and F are defined as BPF CF 564 and the associated protection facilities are defined as CPR CF 566. Working facilities and NEs between nodes C and H are defined as BPF CH 568 and the associated protection facilities are defined as CPR CH 580. PBs may also be defined for example, between node D and node F; node D and node H; node F and node H; node G and node H; etc.

BPFs and CPRs may overlap. This is because different PBs may be assigned to working signals requiring protection which share some of the same protection facilities as other PBs, but not having the exact same protection facilities. Thus, BPF CF (protection facilities from nodes C-G-F) includes the working facilities between nodes C-D and nodes D-F (protection facilities from nodes C-G-F-D), which includes the working facilities for BPF CD.

Figure 6:
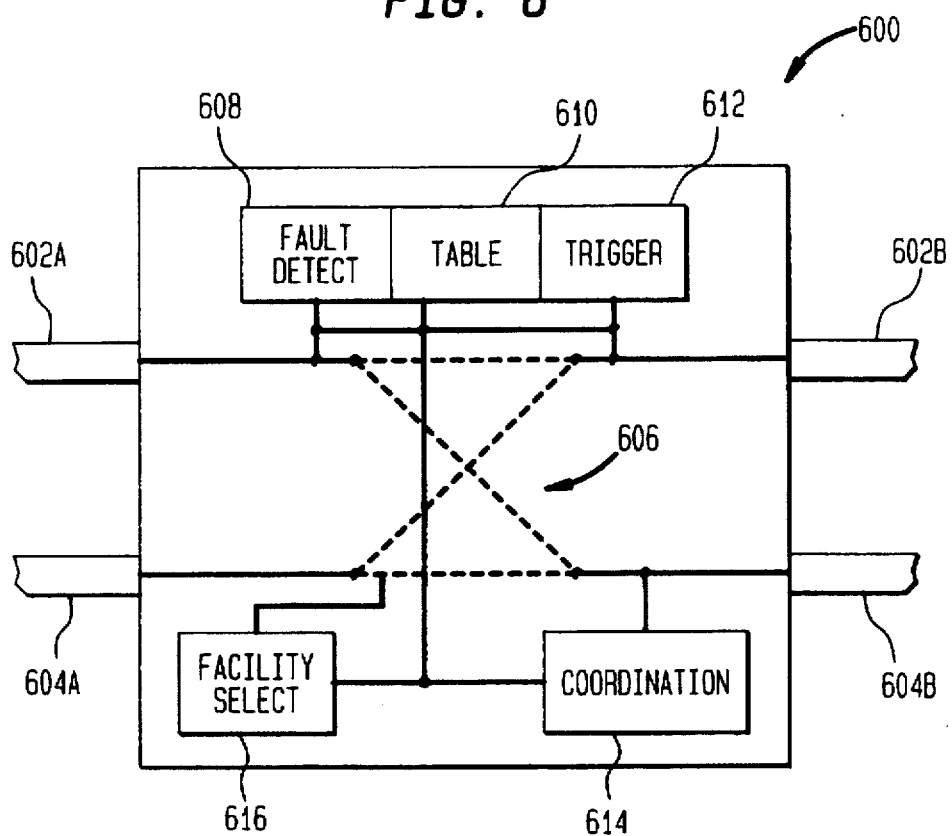
FIG. 6 is a block diagram of a network element according to a preferred embodiment of the present invention.

FIG. 6 is a block diagram of a network element 600 according to a preferred embodiment of the present invention. The network element 600 may be a 1+1 or m:n NE. The NE has working facilities 602A, 602B and protection facilities 604A, 604B. Naturally, if the NE is the first or last node in a linear arrangement (for example, nodes A or H in FIG. 1), the NE may have only one set of working/protection facilities. The NE also has a switch 606. This may be a logical switch, as in a 1+1 arrangement, or a physical switch as in a m:n arrangement.

A fault detector 608 is connected to the working facility input 602A. This detector 608 monitors the incoming signals for failures. This may be done in any manner well known to a person skilled in the art, such as fault management for ATM, WDM, or other protocols. Preferably, each NE 600 maintains information regarding the PBs passing through it. For example, each NE may have a table 610. This table may be connected to the working facility input and may include: a list of each PB passing through it; whether the NE is the originating, terminating, or through node for that PB; and the protection route to switch to if a failure is detected.

A trigger mechanism 612 is connected to an output of the working facilities and is responsive to the fault detector 608 and table 610 to send triggers to terminating nodes of PBs passing through the NE 600. Examples of suitable trigger mechanisms include WDM network optical wavelengths that convey optical operations information, or ATM network AAL-5 (ATM adaption layer 5) connections or currently undefined operation, administration, and maintenance (OAM) cells.

A coordination mechanism 614 may be connected to an output of the protection facilities and responsive to the fault detector 608 and table 610 to initiate switching in a headend switch, if the node 600 has a bidirectional 1+1 or a m:n switching arrangement. A three phase protocol similar to the one used in SONET linear APS may be preferable.

The facility selector 616 is connected to the switch 606 and responsive to the fault detector 608 for switching the NE from the working facility 602A, 602B to the protection facility 604A, 604B. The coordination mechanism 614 may also be responsive to a received coordination signal or a trigger signal and configured to activate the facility selector.

2. The Protection Bundling Process

Figure 7:
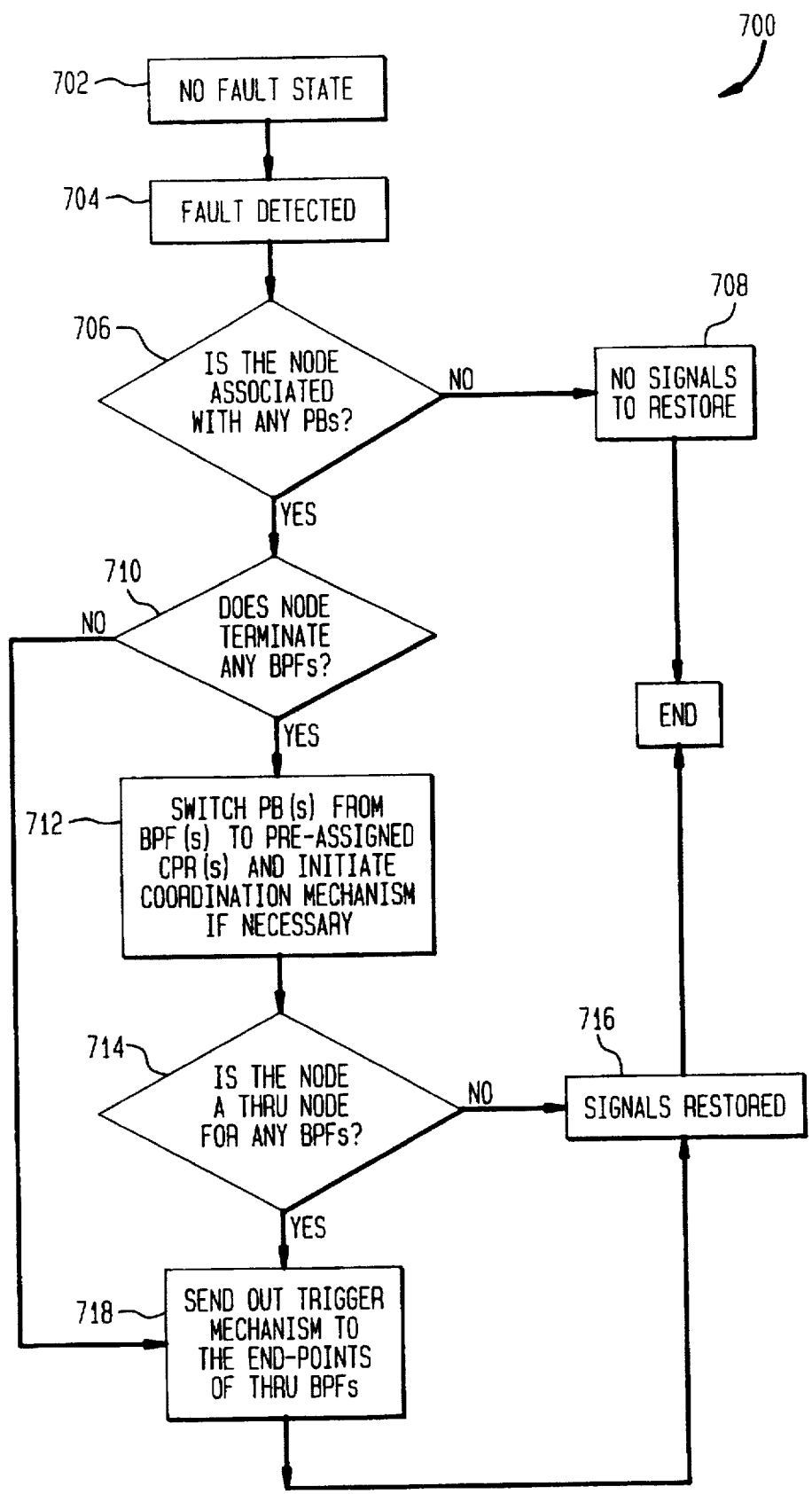
FIG. 7 is a flow chart of a preferred protection bundling process performed by a node that detects.
Figure 8:
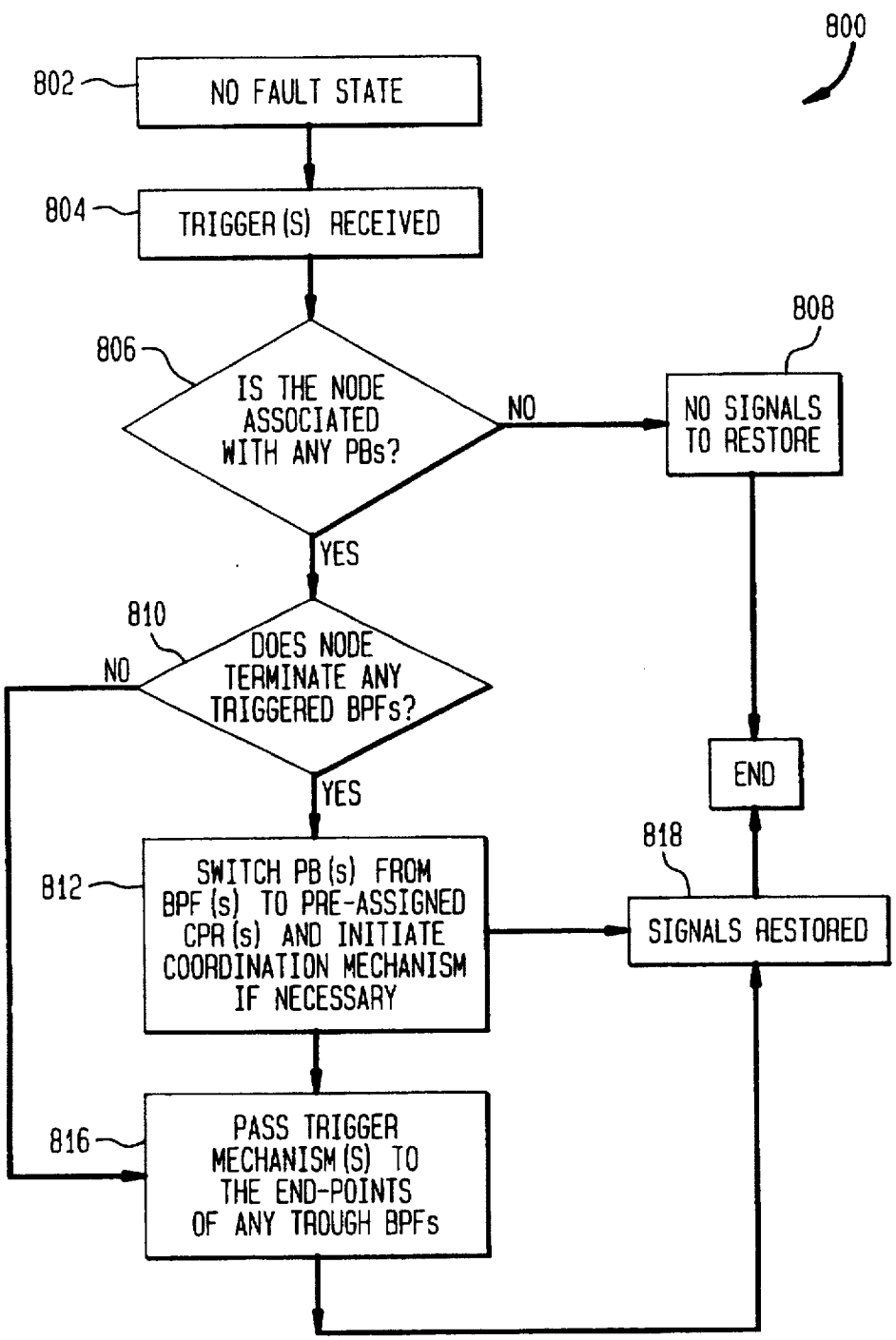
FIG. 8 is a flow chart of a preferred protection bundling process performed by a node that detects a failure and is not the node originally detecting the failure.

FIGS. 7 and 8 provide set basic high-level processes which may be used at any network layer to implement the PB protection switching for link or node failures affecting working signals within a PB. The first process describes the process performed where the node performing the protection bundling switching process is the node detecting the failure (FIG. 6) or if the node performing the protection switching is downstream from the failure and receives a PB trigger (FIG. 8).

FIG. 7 is a flow chart 700 of the protection bundling switching process performed by a node that detects the failure. Assume that in the network in FIGS. 5C and 5D a link failure, such as a break in the link, occurs on link CD 504. The method illustrated in FIG. 7 is the method performed by node D.

Before the link failure occurs, the network is in a no fault state (step 702). After the failure occurs, the node (i.e., node D) detects the failure (step 704), for example, because no signals are received from an adjacent node (i.e., node C) or some or all of the signals received are of a degraded quality. The node determines whether or not it is associated with a protection bundle (step 706). This may be done, for example, by examining the table 610 in the NE. If not, there are no signals to restore (step 708) and the process ends. If the NE is not associated with a PB, as seen in FIG. 5C, node D is associated with a protection bundle (step 706), node D determines whether or not it terminates a BPF (step 710). This may be done, for example, by examining the table 610 in the NE. If, as in FIG. 5C, the node terminates a BPF (i.e., BPF CD), the node initiates a switch for all of the signals assigned to the PB from BPFs to preassigned CPRs; and a coordination mechanism is initiated, if necessary (step 712). (A coordination mechanism may be necessary in bidirectional 1+1 and m:n arrangements to instruct the headend to switch to the protection facility.) The coordination mechanism may be similar to the one used in SONET APS switching or other suitable coordination mechanism. As seen in FIG. 5C, node D will switch the PB from BPF CD along the working facilities to CPR CD along the protection facilities. The PB allows the node to initiate a single switch for all signals assigned to the PB.

After the PB is switched, the node determines if it is a through node for other BPFs (step 714). This may be done, for example, by examining the table 610 in the NE. If the NE is not a through node, the signals will be restored (step 716) and the process ends. If the node is a through node for a BPF (step 714) (in FIGS. 5C and 5D, node D is a through node for BPF CF 564 and BPF CH 568), the node sends out a trigger mechanism to the end points of each through BPF (step 718). In FIG. 5C, node D sends triggers to nodes P and H. The signals are restored (step 716) and the process ends.

If the node does not terminate any BPFs (step 710), the node sends out a trigger mechanism to the end points of the through BPFs (step 718). The signals are restored (step 716) and the process ends.

FIG. 8 is a flow chart 800 of the protection bundling switching process performed by a node which does not directly detect the failure. Rather, this node "detects" the failure indirectly by receiving a trigger from another node. Assume that in the network in FIGS. 5C and 5D, a link failure, such as a break in the link, occurs on link CD 550. The method illustrated in FIG. 8 is the method performed either by node F or node H.

Before the link failure occurs, the network is in a no fault state (step 802). After the failure occurs, the node is informed of the failure when it receives a trigger (step 804). For example, node F receives a trigger from node D (see step 718). When the trigger is received, the node determines whether or not it is associated with a protection bundle (step 806). If not, there are no signals to restore (step 808) and the process is ended. If, as seen in FIG. 5D, node F is associated with a protection bundle (step 706), node P determines whether or not it terminates a BPF (step 810). If, as seen in FIG. 5D, the node terminates the BPF (i.e., BPF CF), the PB is switched from BPFs to preassigned CPRs and a coordination mechanism is initiated, if necessary (step 812). In FIG. 5D, node F switches the PB from BPF CF along the working facilities to CPR CF along the protection facilities. The PB allows the node to initiate a single switch for all signals assigned to the PB.

After the PB is switched (or if the node does not terminate any BPFs (step 810)), if the node is a through node for a PB specified in a trigger (or triggers) received from the detecting node (in FIGS. 5A and 5B, node F is a through node for downstream BPF CH), the node passes the trigger mechanism to the BPF termination node (step 816).

If the node does not terminate any BPFs (step 810), the node passes the trigger(s) mechanism received from the node detecting the failure to the end points of the through BPFs (step 818). The signals are restored (step 816) and the process ends.

As seen in this discussion and accompanying figures, this method may be used in a ring topology (i.e., nodes C-D-F-G) or in a linear topology (i.e., nodes C-D-F-H). Also, because coordination and acknowledgement signals may be used, either dedicated protection (e.g., 1+1) or dynamic switched protection (e.g., 1:1) may be used.

3. Demonstration of Protection Bundle Efficiency

Before the benefits of PB switching working signals may be fully appreciated, the following three aspects of protection switching are discussed:

(1) failure detection;
(2) trigger mechanism; and
(3) coordination protocol.

A. Failure Detection:

Protection switching may be initiated either by a failure affecting individual working signals or all of the working signals within the PB. To detect failures affecting one or more, but not all, of the working signals within the PB, the fault management capabilities of the working signal layer (e.g., ATM or optical) may be used. As noted above, link and node failures affecting all working signals may be detected at the working signals layer using the working signal's existing fault management or by receiving an indication from lower layers.

B. Trigger Mechanism:

A trigger mechanism alerts downstream nodes for the need to initiate protection switching where the node detecting the failure is not the terminating node for one or more BPFs. That is, if BPFs pass through a node detecting a failure, a trigger mechanism is used to notify the end-points of the BPFs passing through the node. In FIG. 5C, for example, node D detects a failure on the CD link 550 and sends a trigger to nodes F and H, which are the end nodes for BPF CF and BPF CH, respectively.

The trigger mechanism generally causes protection switching to be initiated at BPF end-points on associated PBs. The trigger mechanism may also facilitate protection switching of smaller portions of the PB (e.g., in the case of a failure of one or more, but not all of the working signals). This may be done, for example, by identifying the failed subset of the signals in the trigger mechanism. As noted above, WDM networks may use an optical wavelength which conveys optical operations information to carry trigger mechanism messages, while ATM networks, with protected working signals that are VPs or VCs, may use AAL-5 (ATM adaption layer 5) connections or currently undefined operation, administration, and maintenance (OAM) cells.

C. Coordination Protocol:

A coordination protocol provides coordination between the end-points of the BPF during dual-ended and/or bidirectional protection switching. As noted above, a three phase protocol similar to the one used in SONET linear APS may be preferable. The coordination protocol is preferably designed for protection switching an entire associated PB, but should also facilitate the protection switching of smaller portions of the total PB. This may be done, for example, by identifying the failed subset of signals in the coordination mechanism. The coordination protocol should preferably be conveyed in the same method as the trigger mechanism for WDM and ATM networks.

With this understanding, the advantages of protection bundling may be illustrated. Protection bundling provides efficiency by allowing the working signals within the PB to share the same failure detection mechanism, triggering mechanism, and coordination protocol. In contrast, prior known protection switching processes use a separate failure detection mechanism, triggering mechanism, and coordination protocol for each individual working signal. The efficiency of a PB is maximized with link and node failure situations where the entire PB can be treated as a single entity. A scenario evaluating non-PB and PB protection switching in response to a link failure with the following assumptions is used to demonstrate this efficiency:

The network in FIG. 5C is an ATM network with SONET as the physical transport layer.

There is no SONET layer protection switching.

The link between nodes C and D is the failure point.

The links between nodes C-D and D-F are OC-12 (optical carrier level 12) links transporting ATM cells in 4 STS-3cs (synchronous transport signal).

Each STS-3c could have over 4096 working VPs associated with it. For this scenario, assume that 4096 VPs require protection between nodes C and D, and another 4096 require protection between nodes C and F.

The PB protection switching is 1:1; and unused protection facilities along the CPRs are used to transport extra unprotected traffic.

The non-PB protection switching is 1:1 with the diverse protection facilities being used for extra unprotected traffic. Each protection switching action occurs for each protected VP.

ATM cells are used to convey information for the trigger mechanism and coordination protocol. In addition, only the theoretical minimum number of cells are used to complete the protection switching for the PB and non-PB cases.

For simplicity and clarity of illustration, consider only unidirectional events occurring from left to right and assume that working signals between node F and node H are not protected.

Refer again to FIGS. 5A and 5B and assume a link failure occurs on link CD. Recall that FIGS. 4A–4D illustrate the same link failure using a prior art protection switching method. Using the PB method, a link failure between nodes C and D would be detected at node D. Node D immediately sends one coordination cell along CPR CD representing all of the VPs within the PB which traverse BPF CD. Node D also sends one trigger cell to node F for BPF CF because BPF CF passes through node D.

Upon receipt of the coordination cell from node D, node C sends one coordination acknowledgment cell back to node D along CPR CD and switches its working VPs associated with BPF CD to CPR CD. Node D receives the coordination acknowledgment cell from node C and begins receiving VPs from CPR CD. The working PB is now restored.

When node F receives the trigger cells from node D, these nodes initiate the PB protection switching and restore the PB associated with BPF CF using the same method used for the PB terminating on node D.

Figure 9:
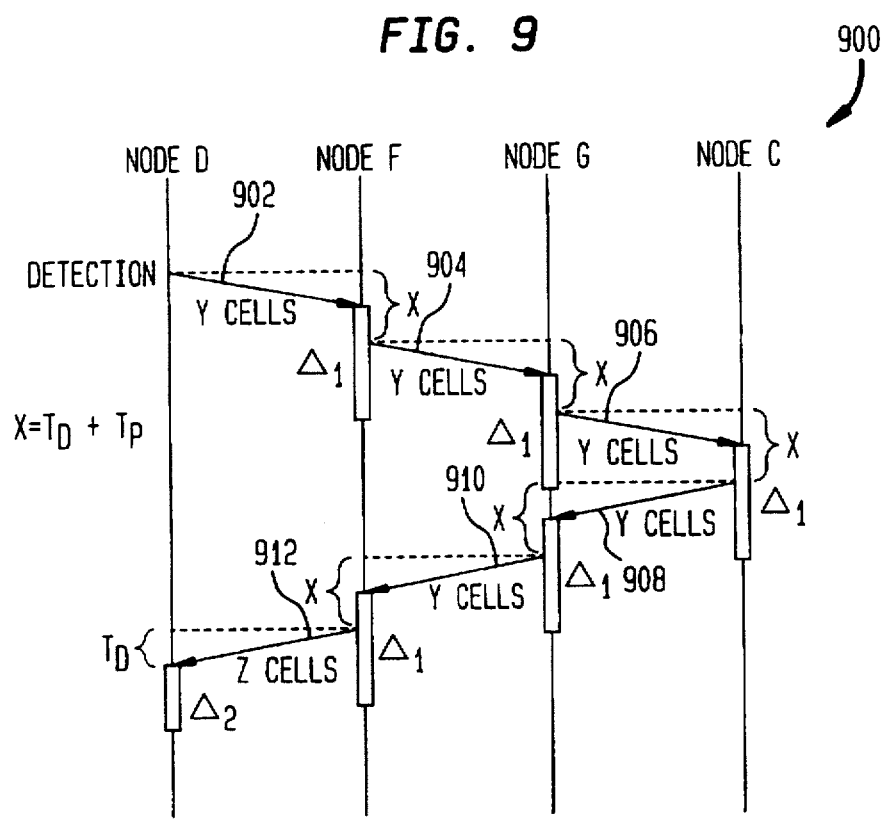
FIG. 9 is timing diagram illustrating the advantages of the inventive method.

FIG. 9 is a timing diagram 900 illustrating the efficiency of using PBs as seen in FIGS. 5A and 5B over the method described in FIGS. 4A–4D. Note that the timing diagram assumes that each of the nodes are equally spaced and the transmission delay ($T_D$) between nodes is the same throughout the diagram. In addition, a small processing delay ($T_P$) is included to account for the SONET and ATM processing that must be done at each node. $T_P$ is included for accuracy only and is not characterized herein. Note that in FIG. 9, $X=T_D+T_P$ and that X is applied to each internode transaction.

In FIG. 9, without protection bundling, 8192 cells (Y number of cells) are sent in each of the following internode transactions: nodes D-F, F-G, G-C, C-G, and G-F; and 4096 cells (Z number of cells) are sent from nodes F-D. The time to transmit 8192 (Y) cells ($\Delta_1$) is 23.2 ms; the time to transmit 4096 (Z) cells ($\Delta_2$) is 11.6 ms. The transactions are as follows. Node D sends 4096 coordination cells (i.e., one cell for each VP or VC passing through the node) to node C and 4096 trigger cells (i.e., one cell for each VP or VC passing through the node) to node F (line 902). Node F sends 4096 coordination cells to node C and passes node D's 4096 coordination cells to node C (line 904). Node G passes nodes D's and F's coordination cells to node C (line 906). In response, node C sends 4096 acknowledgement cells to node D and 4096 acknowledgement cells to node F (line 908). Node G passes the acknowledgement cells to node F (line 910). Node F receives the 4096 acknowledgement cells from node C and passes 4096 acknowledgement cells to node D (line 912).

In contrast, using protection bundling, 2 cells (Y number of cells) are sent in each of the following internode transactions: nodes D-F, F-G, G-C, C-G, and G-F; and 1 cell (Z number of cells) is sent from node F-D. The time to transmit 2 cells ($\Delta_1$) is 5.6 μs; the time to transmit 1 cell ($\Delta_2$) is 2.8 μs. The transactions are as follows. Node D sends one coordination cell (for an entire PB) to node C and one trigger cell to node F (line 902). Node F sends one coordination cell to node C and passes node D's coordination cell (line 904). Node G passes the two coordination cells (line 906). Node C sends one acknowledgement cell to node D and one acknowledgement cell to node F (line 908). Node G passes the two acknowledgement cells (line 910). Node F receives its acknowledgment cell and passes the acknowledgement cell to node D (line 912).

Note that the dark vertical lines in FIG. 9 represent the theoretical best case arrival time for the cells to traverse the given link. The best case arrival times are calculated assuming that after the first bit in the first cell traverses the link, the cells arrive one after the other after at an arrival rate of 149.76 Mb/s.

Table 1 below summarizes the theoretical minimum number of cells needed to traverse each link in the example situation to fully restore traffic. The total is significantly less using the PB method than the prior art method because the detection, triggering, and coordination for protection switching is done once for all of the VPs within a PB instead of once for every VP.

TABLE 1

| Link | Minimum Cells Without Using PBs | Minimum Cells Using PBs |
|---|---|---|
| Link DF | 12,288 | 3 |
| Link FG | 16,384 | 4 |
| Link CG | 16,384 | 4 |
| Total | 45,056 | 11 |

The theoretical minimum number of cells in Table 1 results in the theoretical minimum times in Table 2 below. The times shown are based on theoretical best case arrival rates discussed previously. The totals shown in Table 2 represent the theoretical minimum times for transmission of all the cells required in each case for full restoration without taking into account $T_D$ and $T_P$.

TABLE 2

| Link | Minimum Time For Cells Without VP Bundling | Minimum Time For Cells Using VP Bundling |
|---|---|---|
| Link DF | 34.8ms | 8.5µs |
| Link FG | 46.4ms | 11.3µs |
| Link CG | 46.4ms | 11.3µs |
| Total | 127.6ms | 31.1µs |

Because of the significantly fewer cells transmitted in protection bundling, significantly less time is needed to implement protection switching. $T_P$, moreover, is significantly less for PB because of the significantly fewer cells being processed. The present invention saves network processing time and resources because so fewer cells are used for protection switching.

4. Conclusion

The PB protection switching method described facilitates efficient protection switching and can be applied at any network layer. Working signals sharing the same protection facilities along a CPR are assigned to the same PB. Efficiency is garnered with PB by allowing all the working signals within the PB to share the same failure detection mechanism, triggering mechanism, and coordination protocol, as opposed to a failure detection mechanism, triggering mechanism, and coordination protocol for each individual working signal. The efficiency of PB is thus maximized with link and node failure situations where the entire PB can be treated as a single entity.

The inventive method may be used with any network topology, including both linear and ring arrangements. This inventive method may be used with 1+1 or m:n protection switching arrangements.

The embodiments of the invention described are illustrative only. Numerous alternative embodiments may be devised by those skilled in the art without departing from the scope of the following claims. For example, the invention is described in relation to a SONET/SDH. A person skilled in the art recognizes, however, that the invention may be used any network having protection switching facilities.

APPENDIX

Glossary of Acronyms

| | |
|---|---|
| AAL | ATM Adaption Layer |
| ADM | Add/Drop Multiplexer |
| APS | Automatic Protection Switching |
| ATM | Asynchronous Transfer Mode |
| BLSR | Bidirectional Line Switched Ring |
| BPF | Bundled Protection Fragment |
| CPR | Common Protection Route |
| LAN | Local Area Network |
| NE | Network Element |
| OAM | Operation, Administration, and Maintenance |
| OC-12 | Optical Carrier Level 12 |
| PB | Protection Bundle |
| SDH | Synchronous Digital Hierarchy |
| SONET | Synchronous Optical Network |
| STS | Synchronous Transport Signal |
| UPSR | Unidirectional Path Switched Ring |
| VC | Virtual Channel |
| VP | Virtual Path |
| WAN | Wide Area Network |
| WDM | Wavelength Division Multiplexing |

I claim:

1. A network element for a network performing protection switching and connected to a working facility and a protection facility, comprising:

a. a fault detector connected to the working facility;

b. a table connected to the working facility, the table including a list of protection bundles (PB) passing through the network element, whether the network element is one of an originating, a terminating, and a through node for each listed PB; and a protection route to switch to if a failure is detected;

c. a trigger mechanism connected to an output of the working facilities and responsive to the fault detector and table and configured to send triggers;

d. a facility selector responsive to the fault detector and configured to select one of the working facility and the protection facility; and e. a switch responsive to the facility selector and configured to switch between the working facility and the protected facility.

2. The network element of claim 1, further comprising a coordination mechanism connected to the protection facilities and responsive to the fault detector and table to initiate switching in a headend switch.

3. The network element of claim 2, wherein the coordination mechanism is responsive to one of a received coordination signal and a received trigger signal and configured to activate the facility selector.

4. The network element of claim 1, wherein the switch is a logical switch.

5. The network element of claim 1, wherein the switch is a physical switch.

6. In a network having a plurality of nodes, including terminal and through nodes and at least some of the nodes having associated protection facilities and with all network signals sharing the same protection facilities being assigned to a protection bundle, a method for protection switching comprising the steps of:

detecting a failure at a node;

determining if the node detecting the failure is a through node;

if the node detecting the failure is a through node, sending a trigger signal to the terminal node for each protection bundle for which the node detecting the failure is a through node;

determining if the node detecting the failure is a terminal node for any protection bundle; and if the node detecting the failure is a terminal node for a protection bundle, initiating the switching of the signals assigned to that protection bundle to associated protection facilities; and wherein said network is a synchronous optical network and all network signals sharing the same protection facilities are assigned to the same protection bundle.

* * * * *